United States Patent
Wood et al.

(10) Patent No.: US 8,863,119 B2
(45) Date of Patent: Oct. 14, 2014

(54) METHODS AND SYSTEMS FOR GENERATING A DYNAMIC WORKFLOW IN A MULTI-TENANT DATABASE ENVIRONMENT

(75) Inventors: Stephen Wood, Mill Valley, CA (US); Samuel William Bailey, San Francisco, CA (US); Matthew Lucas, Hengoed (GB)

(73) Assignee: salesforce.com, inc., San Francisco, CA (US)

(*) Notice: Subject to any disclaimer, the term of this patent is extended or adjusted under 35 U.S.C. 154(b) by 811 days.

(21) Appl. No.: 13/116,657

(22) Filed: May 26, 2011

(65) Prior Publication Data

US 2011/0296413 A1    Dec. 1, 2011

Related U.S. Application Data

(60) Provisional application No. 61/349,135, filed on May 27, 2010.

(51) Int. Cl.
  *G06F 9/455* (2006.01)
  *G06F 9/44* (2006.01)
  *G06F 17/30* (2006.01)
  *G06F 9/445* (2006.01)

(52) U.S. Cl.
  CPC ...... *G06F 17/30528* (2013.01); *G06F 9/45504* (2013.01); *G06F 8/67* (2013.01)
  USPC ............................................. 718/1; 717/166

(58) Field of Classification Search
  None
  See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |

(Continued)

*Primary Examiner* — Kenneth Tang
(74) *Attorney, Agent, or Firm* — Blakely, Sokoloff, Taylor & Zafman

(57) ABSTRACT

Techniques and systems for modifying a virtual machine functionality. Archive files each including at least a class files are received. The archive files are stored within the virtual machine. The virtual machine runs on a host system and neither the virtual machine nor the host system are restarted in response to the receiving or storing of the archive files. Files of the host system are scanned to find class files that are not included in a class path for the virtual machine. The class files are copied to a class path for the virtual machine. Neither the virtual machine nor the host system are restarted in response to the copying of the class files. The classes corresponding to the class files are registered in the virtual machine in response to the copying of the class files to the class path. Neither the virtual machine nor the host system are restarted in response to the registration of the classes.

14 Claims, 6 Drawing Sheets

(56) References Cited

U.S. PATENT DOCUMENTS

| | | |
|---|---|---|
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,542,887 B1 * | 4/2003 | Abbott ............................ 1/1 |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,633,892 B1 * | 10/2003 | Chan et al. ...................... 1/1 |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,340,411 B2 | 3/2008 | Cook |
| 7,620,655 B2 | 11/2009 | Larsson et al. |
| 8,352,941 B1 * | 1/2013 | Protopopov et al. ............. 718/1 |
| 8,479,005 B2 * | 7/2013 | Kojima et al. ................. 713/176 |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0177480 A1 * | 9/2003 | Arkwright et al. ............. 717/148 |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015935 A1 * | 1/2004 | Sokolov et al. ................ 717/166 |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0278278 A1 * | 12/2005 | Petev et al. ...................... 707/1 |
| 2007/0169069 A1 * | 7/2007 | Burka et al. ................... 717/166 |
| 2009/0204963 A1 * | 8/2009 | Swart et al. ...................... 718/1 |

* cited by examiner

METHODS AND SYSTEMS FOR GENERATING A DYNAMIC WORKFLOW IN A MULTI-TENANT DATABASE ENVIRONMENT

CLAIM OF PRIORITY

This application claims the benefit of U.S. Provisional Patent Application 61/349,135, entitled Methods and Systems for Generating a Dynamic Workflow In a Multi-Tenant Database Environment, by Steve Wood, et al., filed May 27, 2010, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments of the current implementations relate generally to workflow management. More particularly embodiments of the implementations relate to techniques and mechanisms for generating dynamic workflows in multi-tenant database environments.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed inventions.

Business processes span every department in every industry. They define the best practices of a company. In most companies, processes are manual. They are defined and enforced with, for example, spreadsheets, email, and word of mouth. The result is inconsistent execution, lost opportunities, and higher operating costs.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
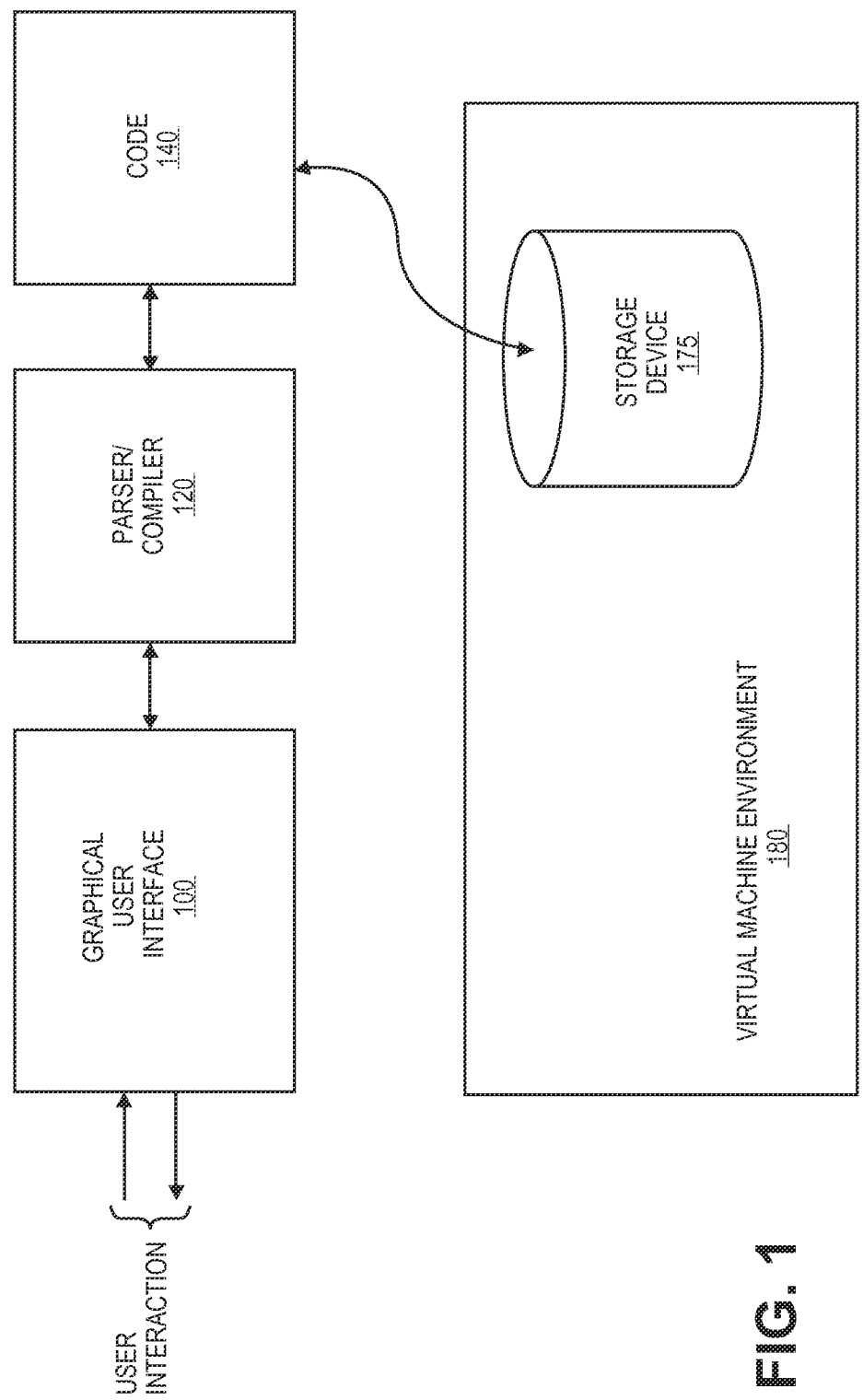
FIG. 1 is a conceptual diagram of a mechanism to allow a user to develop and/or modify a process and implement the process without restarting or rebooting of a virtual machine or host system.

In the following description, numerous specific details are set forth. However, embodiments of the invention may be practiced without these specific details. In other instances, well-known circuits, structures and techniques have not been shown in detail in order not to obscure the understanding of this description.

Systems and methods are provided herein for providing dynamic workflow management in a multi-tenant database system. As used herein, a multi-tenant database system refers to those systems in which various elements of hardware and software of the database system may be shared by one or more customers. For example, a given application server may simultaneously process requests for a great number of customers, and a given database table may store rows for a potentially much greater number of customers.

In one embodiment, a multi-tenant database system utilizes tenant identifiers (IDs) within a multi-tenant environment to allow individual tenants to access their data while preserving the integrity of other tenant's data. In one embodiment, the multitenant database stores data for multiple client entities each identified by a tenant ID having one of one or more users associated with the tenant ID. Users of each of multiple client entities can only access data identified by a tenant ID associated with their respective client entity. In one embodiment, the multitenant database is a hosted database provided by an entity separate from the client entities, and provides on-demand and/or real-time database service to the client entities.

Cloud computing and/or multitenant environments make a new class of applications possible. To help get the most from these process-aware applications, a visual process manager may be provided. This design tool lets a user visually draw process flows or decision trees, and automatically build these processes into a corresponding application. In one embodiment, these applications can then be run by applications in a cloud computing or multitenant environment.

In one embodiment, the visual process manager may function like having a navigation system inside an application to help users make better and faster decisions. Applications may become more useful when users are provided with recommendations, wizards, and automated tasks. Previously, applications began with someone drawing out the business process. The process then gets hardcoded into the application and cannot be easily changed as the business grows and adapts to the marketplace.

Yet processes change on a monthly, weekly, and even daily basis. As a cloud-based process management solution, the visual process manager combines the speed and ease of the cloud with graphical process design to create a solution designed for continual process iteration. In one embodiment, designing and changing business processes may be done in a drag-and-drop designer. It may be accomplished in as little as four steps:

Step 1: Visual process designer—A user may design the processes with an intuitive user interface. For example, draw from a library of process tools, including presentation components (e.g., forms, questions, choices, and more) and logic components (e.g., task assignments, decision trees, and approval processes). The user may add components to a visual process design diagram through, for example, drag-and-drop actions. The development environment may provide wizards to the user interface so that a user may build an application with no programming. In one embodiment, wizards can guide users through a process by deciding which pages to display next based on user input.

Step 2: Process simulator—The user and/or the development environment may function to optimize the process design by simulating processes before deploying them. This simulation may identify bottlenecks and conflicts, and iterate the process as needed.

Step 3: Real-time process engine—When an application is ready, the development environment may deploy it to the cloud or multitenant environment. In one embodiment, the real-time process engine automatically scales the application to fit the needs of a tenant based on, for example, size. The run-time engine may ensure the process is run consistently without fail, including security measures, process decisions, callouts, and automated actions, etc.

Once the application(s) is/are ready the files associated with the application(s) can be stored in the cloud or multitenant environment. In one embodiment, these files are archive files that include multiple class files that loaded and executed in running the application(s). As described in greater detail below, these archive files may be discovered via an automated mechanism that scans files of a host system to find archive files.

Classes included in the archive files may be copied to a class path so that the environment in which the applications are executed may access the classes. In one embodiment, the classes may be registered without need of rebooting or otherwise restarting the host system or the virtual machine environment in which the applications may run.

FIG. 1 is a conceptual diagram of a mechanism to allow a user to develop and/or modify a process and implement the process without restarting or rebooting of a virtual machine or host system. In one embodiment, the user may utilize a client computer device to develop the process that may be uploaded to and/or executed by a multitenant environment. Example embodiments of client devices coupled with multitenant environments are described in greater detail below.

A user may interact with graphical user interface 100 to design a process (e.g., a business process, a work flow, a sales flow) that may be implemented in virtual machine environment 180. In one embodiment, the user may interact with graphical user interface 100 to use graphical representations of process steps or elements that may be manipulated via user interactions with graphical interface 100 to construct a process to be implemented in virtual machine environment 180.

The process constructed via graphical interface 100 may be parsed and/or compiled by parser/compiler 120. Parser/compiler 120 may function to convert the graphical representation of the process to be implemented to code 140 that may be executed in virtual machine environment 180. In one embodiment, parser/compiler 120 desterilizes the process and stores the result in a database. In one embodiment, parser/compiler 120 does not convert the process to bytecode to be executed.

In one embodiment, a state machine utilizes metadata from the process to construct and execute the process. Metadata refers to a process description that is not compiled, but is converted from a description to an object model that is utilized by the state machine.

In one embodiment, parser/compiler 120 may provide analysis and/or debugging functionality to assist the user in determining whether the process designed using graphical user interface 100 will provide the desired functionality. In one embodiment, parser/compiler 120 operates on a pre-selected set of entry points or "hooks" that may be utilized to integrate code 140 into existing code that may be executed in virtual machine environment 180.

Once code 140 is created, it may be stored on storage device 175 that may be accessible by virtual machine environment 180. In one embodiment, storage device 175 represents a physical storage medium that is part of a host system (not illustrated in FIG. 1) upon which virtual machine environment 180 exists. Virtual machine environment 180 may access all or a portion of storage device 175 during execution to provide a virtual machine experience to a user thereof.

Figure 2:
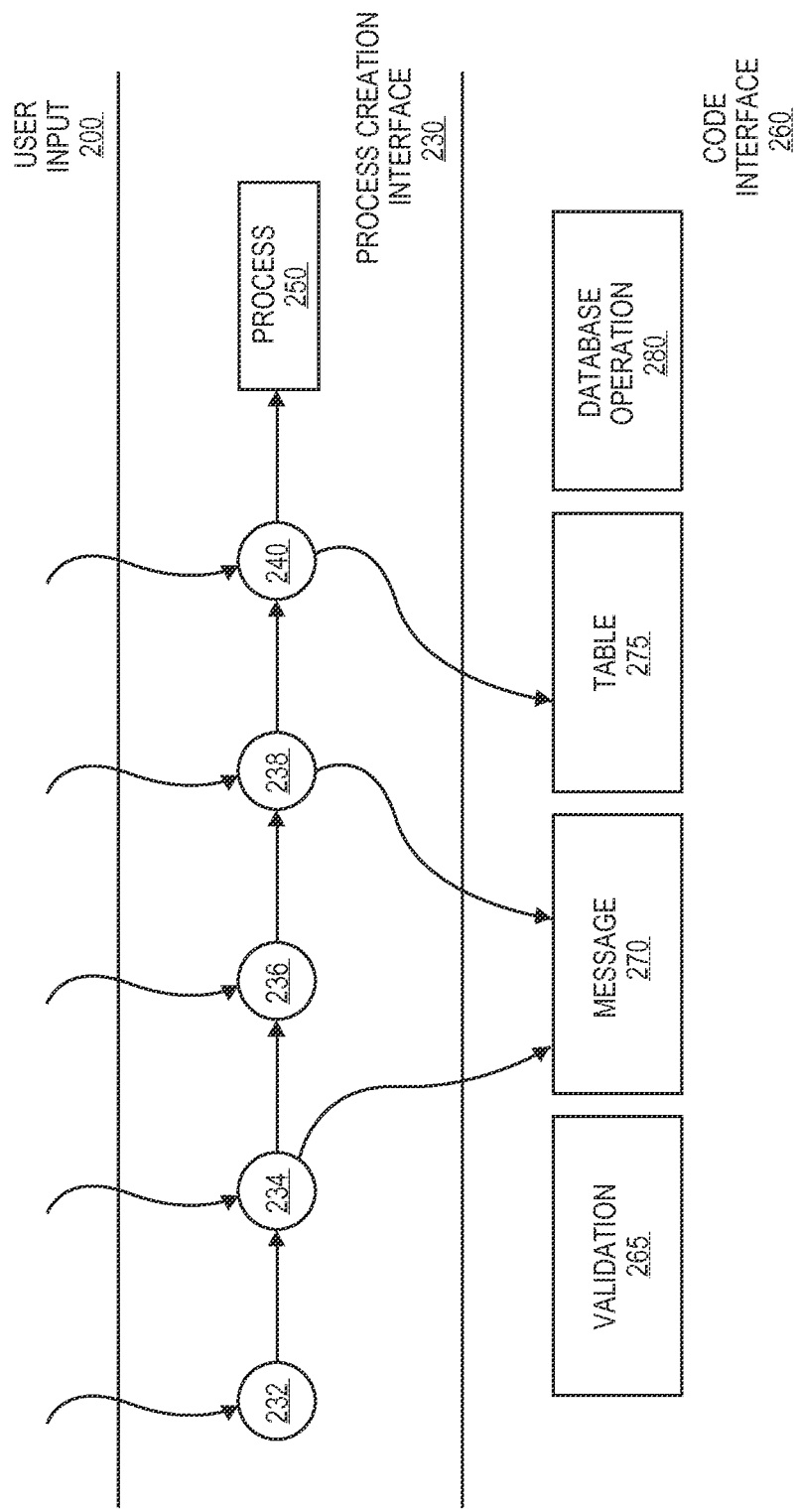
FIG. 2 is a conceptual illustration of a workflow for generating a process without restarting or rebooting of a virtual machine or host system.

FIG. 2 is a conceptual illustration of a workflow for generating a process without restarting or rebooting of a virtual machine or host system. The illustration of FIG. 2 provides a conceptual illustration of an interaction between user interface objects that may be used to create a process and one or more corresponding code entry points.

User input may be received by process creation interface 230 to assemble one or more process nodes (e.g., 232, 234, 236, 238, 240) to construct a process. The nodes may represent pre-defined operations or responses that the user desires to be included in the process being constructed. One or more of the nodes may include calls to lower level code blocks (e.g., 265, 270, 275, 280) that may provide access to certain types of operations associated with the code blocks.

For example, node 234 may include an operation that uses a message that may be passed to another entity. In one embodiment, node 234 includes a call to message code 270 to provide an entry into messaging operations supported by the virtual machine interface in which the process will operate. Similarly, node 238 may use a different kind of message, but still include a call to message code 270 to implement the message functionality of node 238.

As another example, node 240 may include a call to table code 275, which may provide the functionality to create a table based on input from node 240. The example of FIG. 2 provides code blocks for validation, messaging, tables and database operations. In alternate embodiments, additional and/or different code entry points may be supported. In one embodiment, when the interface components are parsed and/or compiled, calls to the code blocks and/or portions of the code blocks may be included in the resulting compiled code. This may provide a more standardized code interface that may support the integration procedures described below as well as result in a reduced likelihood of errors.

Figure 3:
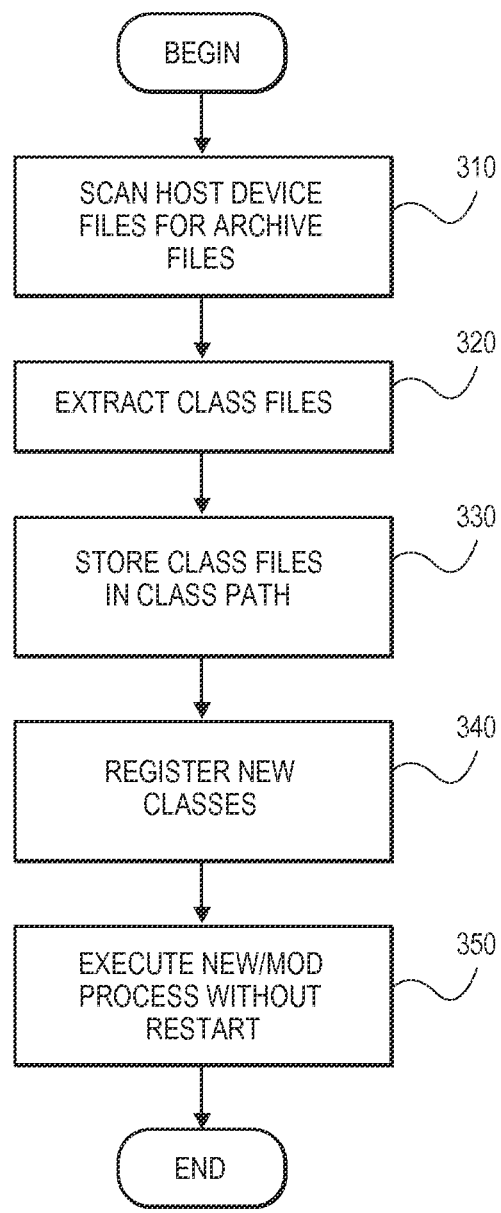
FIG. 3 is a flow diagram of one embodiment of a technique for integrating new code into a running virtual machine environment.

FIG. 3 is a flow diagram of one embodiment of a technique for integrating new code into a running virtual machine environment. The functionality described with respect to FIG. 3 may be provided by a user/client computer system, by a server system providing at least a portion of a multitenant or cloud environment, or some combination thereof.

All or a portion of the file system of the host computer system is scanned for archive files or other files including classes to be used by a process (created as described above) or other functionality, 310. In one embodiment, the scanning is triggered by a call to a class or function that is not registered. In another embodiment, the scanning is triggered by a user-generated request. In yet another embodiment, the scanning may be triggered by a timer function (e.g., scan every 60 minutes, 4 times a day, every 30 minutes). Combinations of these triggering events may also be supported.

In one embodiment, an agent or other component on the host system analyzing file directories of the host system to find files that may include classes that have not been registered accomplishes scanning In one embodiment, the agent scans the file directories for archive files (e.g., .jar files for JAVA®) or class files (e.g., .class files for JAVA®).

The identified class files are extracted, 320, if necessary. If a file includes only a single class, then no extraction may be necessary. If a file includes multiple classes, the multiple classes may be extracted and, for example, stored as individual files, or links/pointers to the individual classes.

The identified classes are stored on the class path, 330. Storing the classes on the class path allows the virtual machine environment to determine what classes are supported. The new classes may be registered, 350, without requiring a restart of the virtual machine environment.

Figure 4:
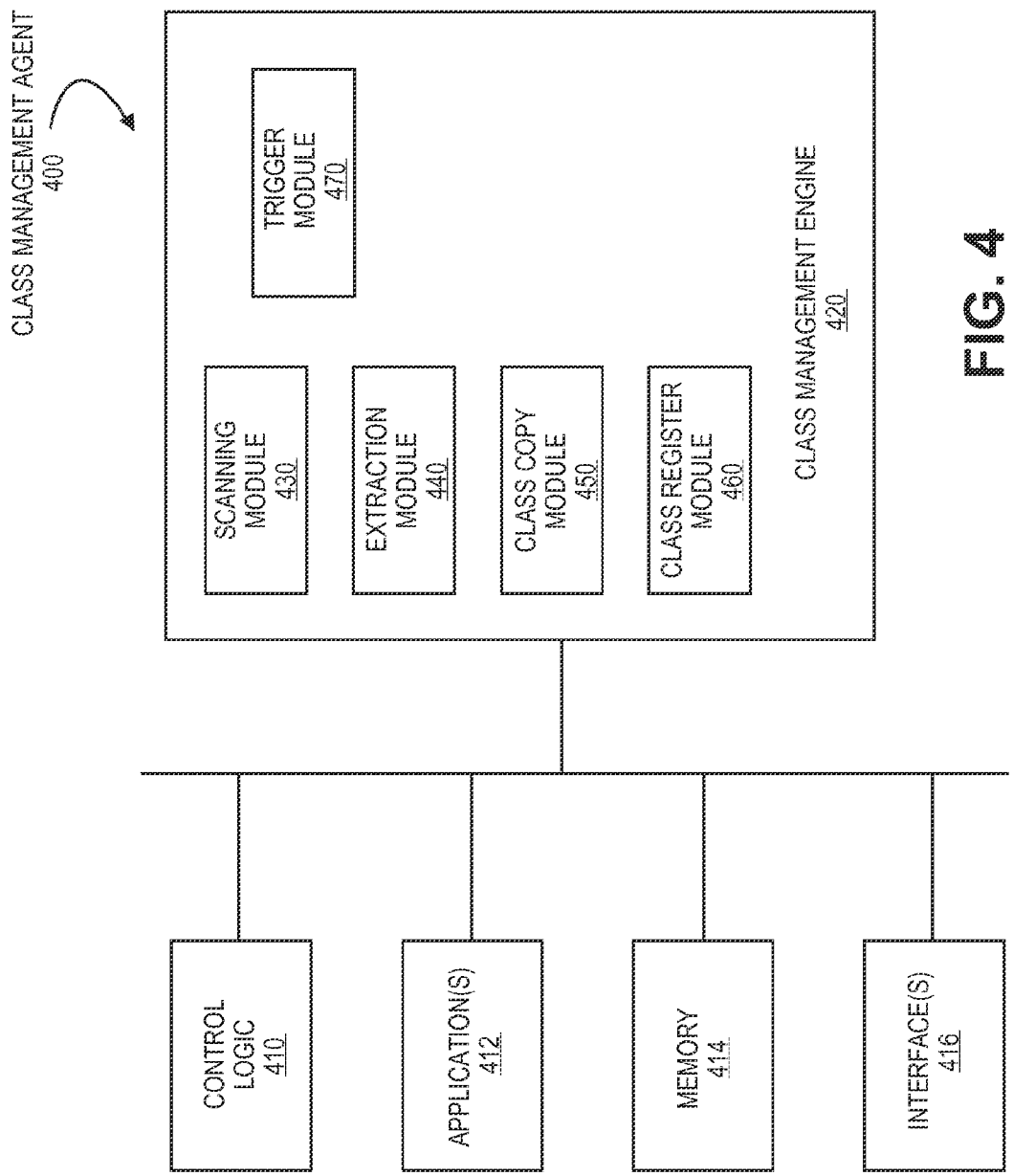
FIG. 4 is a block diagram of one embodiment of an agent to provide integration of new code into a running virtual machine environment.

FIG. 4 is a block diagram of one embodiment of an agent to provide integration of new code into a running virtual machine environment. The agent of FIG. 4 may provide the functionality discussed above with respect to FIG. 3. The agent may exist, for example, within a virtual machine that may be part of a multitenant environment. As another example, the agent may be part of an application running on a server computing platform.

Class management agent 400 includes control logic 410, which implements logical functional control to direct operation of class management agent 400, and/or hardware associated with directing operation of class management agent 400. Logic may be hardware logic circuits and/or software routines. In one embodiment, class management agent 400 includes one or more applications 412, which represent code sequence and/or programs that provide instructions to control logic 410.

Class management agent 400 includes memory 414, which represents a memory device and/or access to a memory resource for storing data and/or instructions. Memory 414 may include memory local to class management agent 400, as well as, or alternatively, including memory of the host system on which class management agent 400 resides. Class management agent 400 also includes one or more interfaces 416, which represent access interfaces to/from (an input/output interface) class management agent 400 with regard to entities (electronic or human) external to class management agent 400.

Class management agent 400 also includes class management engine 420, which represents one or more functions or module that enable class management agent 400 to provide the indexing services as described above. The example of FIG. 4 provides several modules that may be included in class management engine 420; however, different and/or additional modules may also be included. Example modules that may be involved in providing the class management functionality include scanning module 430, extraction module 440, class copy module 450, class register module, and trigger module 470. Each of these modules may further include other sub-modules to provide other functions. As used herein, a module refers to routine, a subsystem, logic circuit, microcode, etc., whether implemented in hardware, software, firmware or some combination thereof.

Scanning module 430 operates to scan the host system for files that may include one or more classes. In one embodiment, scanning module 430 may scan the contents of files located on the host system for classes. Scanning module 430 may, for example, search for tags or other character strings that indicate a class definition. Other techniques for identifying classes may also be used. Scanning module 430 may provide an identification of, or link or path to, one or more files including one or more classes to other modules in class management agent 400.

Extraction module 440 operates to extract classes from files that include the classes. In one embodiment, extraction module 440 operates in information provided by scanning module 430 to locate files including classes. Extraction module 440 extracts one or more classes from the files. Class copy module 450 operates to copy the classes to the class path, or other location, where the classes may be registered. Class copy module 450 may operate with extraction module 440 to copy the classes.

Class register module 460 operates to register the classes with the host system and/or virtual machine. In one embodiment, class register module 460 scans the class path to determine whether any classes on the class path have not been registered, and registers the classes. Class register module 460 causes the classes to be registered without requiring that the host system and/or virtual machine to be restarted.

Trigger module 470 operates to trigger the scanning and registration process discussed above. In one embodiment, trigger module 470 operates as a timer to trigger scanning and/or registration upon the expiration of specified time intervals. In another embodiment, trigger module 470 operates to trigger scanning and/or registration upon detecting specified conditions, for example, a call to a class that has not been registered. Other conditions may also be supported.

Figure 5:
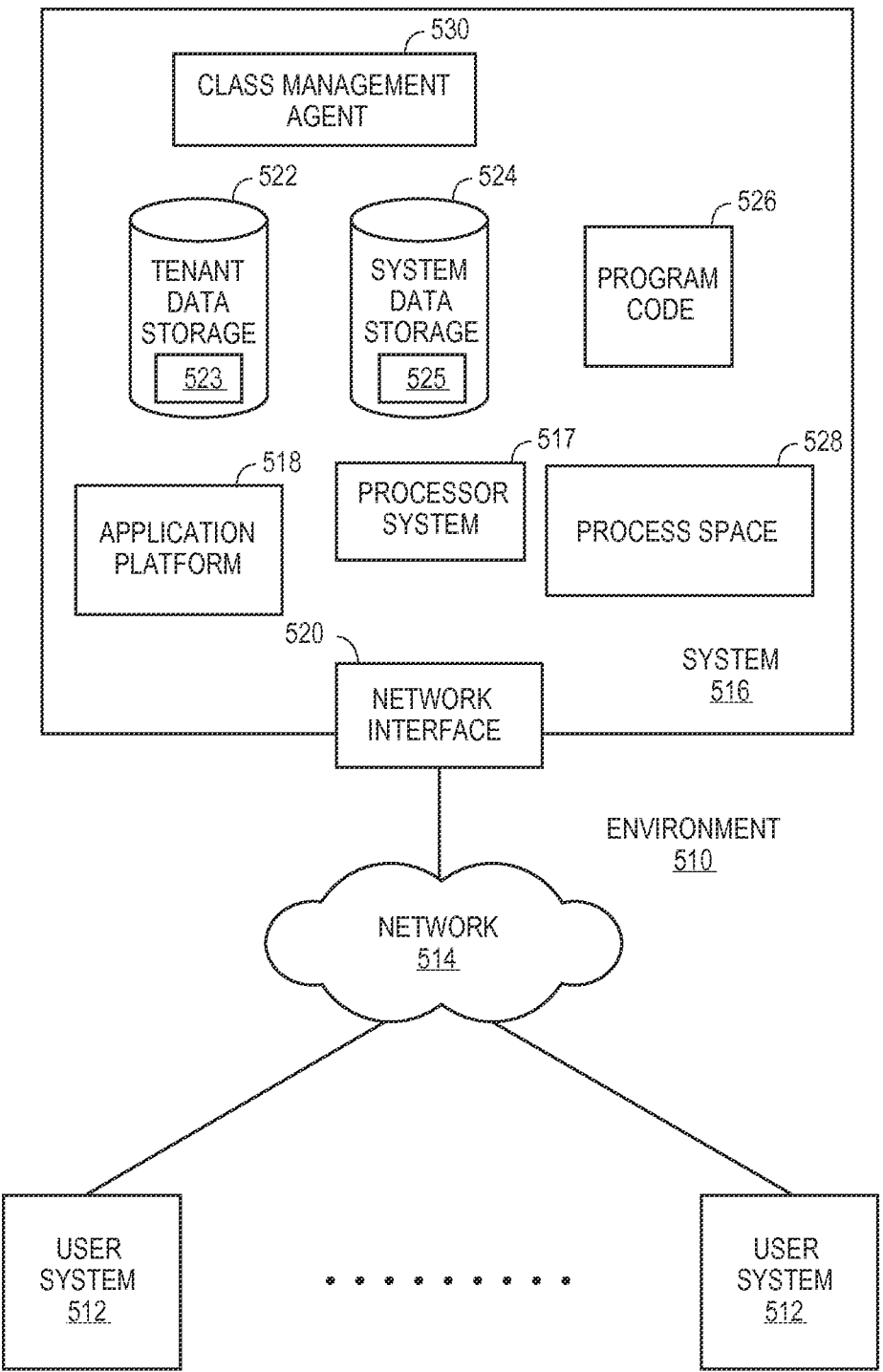
FIG. 5 is a block diagram of an environment in which an on-demand database service might be used.

FIG. 5 is a block diagram of an environment in which an on-demand database service might be used. Environment 510 may include user systems 512, network 514, system 516, processor system 517, application platform 518, network interface 520, tenant data storage 522, system data storage 524, program code 526, and process space 528. In other embodiments, environment 510 may not have all of the components listed and/or may have other elements instead of, or in addition to, those listed above.

In one embodiment, environment 510 is an environment in which an on-demand database service exists. In another embodiment, environment 510 is a cloud computing environment that provides services to multiple users. User system 512 may be any machine or system that is used by a user to access a database user system. For example, any of user systems 512 can be a handheld computing device, a mobile phone, a laptop computer, a work station, and/or a network of computing devices. As illustrated in FIG. 5 (and in more detail in FIG. 6) user systems 512 might interact via a network 514 with an on-demand database service, which is system 516.

An on-demand database service, such as system 516, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 516" and "system 516" will be used interchangeably herein.

A database image may include one or more database objects. A relational database management system (RDMS) or the equivalent may execute storage and retrieval of information against the database object(s). Application platform 518 may be a framework that allows the applications of system 516 to run, such as the hardware and/or software, e.g., the operating system. In an embodiment, on-demand database service 516 may include an application platform 518 that enables creation, managing and executing one or more applications developed by the provider of the on-demand database service, users accessing the on-demand database service via user systems 512, or third party application developers accessing the on-demand database service via user systems 512.

Network 514 is any network or combination of networks of devices that communicate with one another. For example, network 514 can be any one or any combination of a LAN (local area network), WAN (wide area network), telephone network, wireless network, point-to-point network, star network, token ring network, hub network, or other appropriate configuration. Indexer(s) 530 may include one or more indexers that operate as described herein with the indexes created by indexer(s) 530 being backed up as described herein.

One arrangement for elements of system 516 is shown in FIG. 5, including network interface 520, application platform 518, tenant data storage 522 for tenant data 523, system data storage 524 for system data 525 accessible to system 516 and possibly multiple tenants, program code 526 for implementing various functions of system 516, and a process space 528 for executing MTS system processes and tenant-specific processes, such as running applications as part of an application hosting service.

In one embodiment, class management agent 530 resides in system 516. In one embodiment, class management agent 530 may provide some or all of the functionality of the agent described above, for example, the agent of FIG. 4. In another embodiment, class management agent 530 may reside on multiple systems and/or user devices.

Several elements in the system shown in FIG. 5 include conventional, well-known elements that are explained only briefly here. For example, each user system 512 could include a desktop personal computer, workstation, laptop, PDA, cell phone, or any wireless access protocol (WAP) enabled device or any other computing device capable of interfacing directly or indirectly to the Internet or other network connection. Each user system 512 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 516 or other systems or servers.

The user interface device can be used to access data and applications hosted by system 516, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 512 and all of its components are operator configurable using applications, such as a browser, including computer code run using a central processing unit such as an Intel Pentium® processor or the like. Similarly, system 516 (and additional instances of an MTS, where more than one is present) and all of their components might be operator configurable using application (s) including computer code to run using a processing unit such as processor system 517, which may include an Intel Pentium® processor or the like, and/or multiple processor units.

A computer program product embodiment includes a machine-readable storage medium (media) having instructions stored thereon/in which can be used to program a computer to perform any of the processes of the embodiments described herein. Computer code for operating and configuring system 516 to intercommunicate and to process web pages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data.

Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 516 is configured to provide webpages, forms, applications, data and media content to user (client) systems 512 to support the access by user systems 512 as tenants of system 516. As such, system 516 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B).

As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 6:
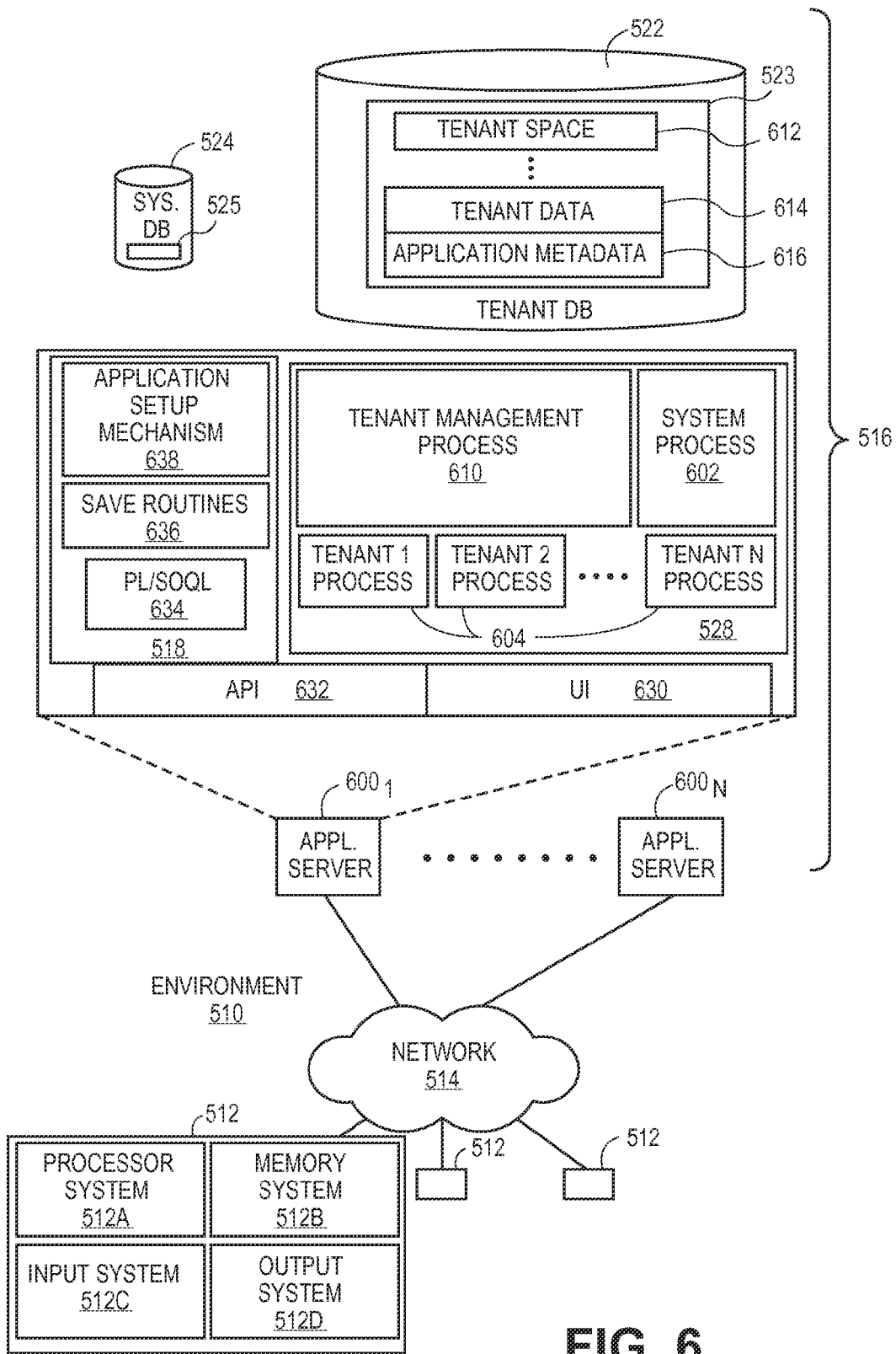
FIG. 6 is a block diagram of one embodiment of a multi-tenant environment.

In FIG. 6 elements of system 516 and various interconnections in an embodiment are further illustrated. FIG. 6 shows that user system 512 may include processor system 512A, memory system 512B, input system 512C, and output system 512D. FIG. 6 shows network 514 and system 516. FIG. 6 also shows that system 516 may include tenant data storage 522, tenant data 523, system data storage 524, system data 525, User Interface (UI) 630, Application Program Interface (API) 632, PL/SOQL 634, save routines 636, application setup mechanism 638, applications servers $600_1$-$600_N$, system process space 602, tenant process spaces 604, tenant management process space 610, tenant storage area 612, user storage 614, and application metadata 616. In other embodiments, environment 510 may not have the same elements as those listed above and/or may have other elements instead of, or in addition to, those listed above.

User system 512, network 514, system 516, tenant data storage 522, and system data storage 524 were discussed above in FIG. 5. Regarding user system 512, processor system 512A may be any combination of one or more processors. Memory system 512B may be any combination of one or more memory devices, short term, and/or long term memory. Input system 512C may be any combination of input devices, such as one or more keyboards, mice, trackballs, scanners, cameras, and/or interfaces to networks. Output system 512D may be any combination of output devices, such as one or more monitors, printers, and/or interfaces to networks.

As shown by FIG. 6, system 516 may include a network interface 520 implemented as a set of HTTP application servers 600, an application platform 518, tenant data storage 522, and system data storage 524. Also shown is system process space 602, including individual tenant process spaces 604 and a tenant management process space 610. Each application server 600 may be configured to tenant data storage 522 and the tenant data 523 therein, and system data storage 524 and the system data 525 therein to serve requests of user systems 512. The tenant data 523 might be divided into individual tenant storage areas 612, which can be either a physical arrangement and/or a logical arrangement of data. Within each tenant storage area 612, user storage 614 and application metadata 616 might be similarly allocated for each user. For example, a copy of a user's most recently used (MRU) items might be stored to user storage 614. Similarly, a copy of MRU items for an entire organization that is a tenant might be stored to tenant storage area 612. A UI 630 provides a user interface and an API 632 provides an application programmer interface to system 516 resident processes to users and/or developers at user systems 512. The tenant data and the system data may be stored in various databases, such as one or more Oracle™ databases.

Application platform 518 includes an application setup mechanism 638 that supports application developers' creation and management of applications, which may be saved as metadata into tenant data storage 522 by save routines 636 for execution by subscribers as one or more tenant process spaces 604 managed by tenant management process 610, for example. Invocations to such applications may be coded using PL/SOQL 534 that provides a programming language style interface extension to API 632. A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 616 for the subscriber making the invocation and executing the metadata as an application in a virtual machine.

Each application server 600 may be communicably coupled to database systems, e.g., having access to system data 525 and tenant data 523, via a different network connection. For example, one application server $600_1$ might be coupled via the network 514 (e.g., the Internet), another application server $600_{N-1}$ might be coupled via a direct network link, and another application server $600_N$ might be coupled by yet a different network connection. Transfer Control Protocol and Internet Protocol (TCP/IP) are typical protocols for communicating between application servers 600 and the database system. However, other transport protocols may be used to optimize the system depending on the network interconnect used.

In certain embodiments, each application server 600 is configured to handle requests for any user associated with any organization that is a tenant. Because it is desirable to be able to add and remove application servers from the server pool at any time for any reason, there may no server affinity for a user and/or organization to a specific application server 600. In one embodiment, therefore, an interface system implementing a load balancing function (e.g., an F5 Big-IP load balancer) is communicably coupled between the application servers 600 and the user systems 512 to distribute requests to the application servers 600.

In one embodiment, the load balancer uses a least connections algorithm to route user requests to the application servers 600. Other examples of load balancing algorithms, such as round robin and observed response time, also can be used. For example, in certain embodiments, three consecutive requests from the same user could hit three different application servers 600, and three requests from different users could hit the same application server 600. In this manner, system 516 is multi-tenant, wherein system 516 handles storage of, and access to, different objects, data and applications across disparate users and organizations.

As an example of storage, one tenant might be a company that employs a sales force where each salesperson uses system 516 to manage their sales process. Thus, a user might maintain contact data, leads data, customer follow-up data, performance data, goals and progress data, etc., all applicable to that user's personal sales process (e.g., in tenant data storage 522). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 516 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 516 might also maintain system level data usable by multiple tenants or other data. Such system level data might include industry reports, news, postings, and the like that are sharable among tenants.

In certain embodiments, user systems 512 (which may be client systems) communicate with application servers 600 to request and update system-level and tenant-level data from system 516 that may require sending one or more queries to tenant data storage 522 and/or system data storage 524. System 516 (e.g., an application server 600 in system 516) automatically generates one or more SQL statements (e.g., one or more SQL queries) that are designed to access the desired information. System data storage 524 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema.

Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method of modifying a virtual machine functionality, the method comprising:
    receiving one or more archive files each including at least a class file;
    storing the one or more archive files within the virtual machine, wherein the virtual machine runs on a host system and neither the virtual machine nor the host system are restarted in response to the receiving or storing of the one or more archive files;
    scanning files of the host system to find one or more class files that are not included in a class path for the virtual machine;
    copying the one or more class files to a class path for the virtual machine, wherein neither the virtual machine nor the host system are restarted in response to the copying of the one or more class files; and
    registering one or more classes corresponding to the one or more class files in the virtual machine in response to the copying of the one or more class files to the class path, wherein neither the virtual machine nor the host system are restarted in response to the registration of the one or more classes.

2. The method of claim 1 wherein the file includes bytecode to provide the functionality.

3. The method of claim 1 wherein the multitenant environment comprises a multitenant database environment, wherein the multitenant database environment stores data for multiple client entities each identified by a tenant identifier (ID) having one of one or more users associated with the tenant ID, wherein users of each of multiple client entities can only access data identified by a tenant ID associated with the respective client entity, and wherein the multitenant database is a hosted database provided by an entity separate from the client entities, and provides on-demand database service to the client entities.

4. The method of claim 3 further comprising assigning the one or more classes to at least one tenant in the multitenant database environment.

5. The method of claim 1 wherein the one or more archive files comprise bytecode files.

6. The method of claim 1 wherein the scanning the one or more archive files of the host system is triggered by a call to a component type that is not registered.

7. The method of claim 1 wherein the scanning the one or more archive files of the host system is triggered by a refresh request.

8. An article of manufacture comprising a computer-readable medium having stored thereon instructions, that when executed, cause one or more processors to modify a virtual machine functionality, the one or more processors to:
    receive one or more archive files each including at least a class file;
    store the one or more archive files within the virtual machine, wherein the virtual machine runs on a host system and neither the virtual machine nor the host system are restarted in response to the receiving or storing of the one or more archive files;
    scan files of the host system to find one or more class files that are not included in a class path for the virtual machine;
    copy the one or more class files to a class path for the virtual machine, wherein neither the virtual machine nor the host system are restarted in response to the copying of the one or more class files; and
    register one or more classes corresponding to the one or more class files in the virtual machine in response to the copying of the one or more class files to the class path, wherein neither the virtual machine nor the host system are restarted in response to the registration of the one or more classes.

9. The article of claim 8 wherein the file includes bytecode to provide the functionality.

10. The article of claim 9 wherein the multitenant environment comprises a multitenant database environment, wherein the multitenant database environment stores data for multiple client entities each identified by a tenant identifier (ID) having one of one or more users associated with the tenant ID, wherein users of each of multiple client entities can only access data identified by a tenant ID associated with the respective client entity, and wherein the multitenant database is a hosted database provided by an entity separate from the client entities, and provides on-demand database service to the client entities.

11. The article of claim 10 further comprising instructions that, when executed, cause the one or more processors to assign the one or more classes to at least one tenant in the multitenant database environment.

12. The article of claim 8 wherein the one or more archive files comprise bytecode files.

13. The article of claim 8 wherein the scanning the one or more archive files of the host system is triggered by a call to a component type that is not registered.

14. The article of claim 8 wherein the scanning the one or more archive files of the host system is triggered by a refresh request.

* * * * *